(12) United States Patent
Shaked et al.

(10) Patent No.: US 7,266,246 B2
(45) Date of Patent: Sep. 4, 2007

(54) SYSTEM AND METHOD FOR ESTIMATING COMPRESSION NOISE IN IMAGES

(75) Inventors: Doron Shaked, Haifa (IL); Hila Nachlieli, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 10/835,888

(22) Filed: Apr. 29, 2004

(65) Prior Publication Data

US 2005/0244061 A1 Nov. 3, 2005

(51) Int. Cl.
*G06K 9/36* (2006.01)
*G06K 9/46* (2006.01)

(52) U.S. Cl. .................. 382/232; 382/275; 382/286

(58) Field of Classification Search ........... 382/232, 382/239, 264, 275, 286
See application file for complete search history.

(56) References Cited

U.S. PATENT DOCUMENTS

| | | | |
|---|---|---|---|
| 5,323,187 A | 6/1994 | Park et al. | |
| 5,363,209 A | 11/1994 | Eschbach et al. | |
| 5,867,606 A | 2/1999 | Tretter | |
| 6,118,906 A | 9/2000 | Keyes et al. | |
| 6,173,069 B1 * | 1/2001 | Daly et al. | 382/118 |
| 6,285,801 B1 | 9/2001 | Mancuso et al. | |
| 6,324,307 B1 * | 11/2001 | Overton | 382/275 |
| 6,654,417 B1 | 11/2003 | Hui | |
| 7,003,174 B2 * | 2/2006 | Kryukov et al. | 382/266 |
| 2002/0097911 A1 | 7/2002 | de Queiroz | |
| 2002/0131647 A1 | 9/2002 | Matthews | |
| 2003/0035581 A1 | 2/2003 | Islam | |

FOREIGN PATENT DOCUMENTS

| | | |
|---|---|---|
| EP | 1168824 | 1/2002 |
| EP | 1205878 | 5/2002 |
| WO | WO02/05121 | 1/2002 |

OTHER PUBLICATIONS

Jung, et al.; "Univariant Assessment of the Quality of Images"; pp. 354-364; Journal of Electronic Imaging; Jul. 2002.
Kundar, et al.; "Blind Image Deconvolution"; pp. 43-64; IEEE Signal Processing Magazine; May 1996.
Acton, et al.; "Nonlinear Image Estimation Using Piecewise and Local Image Models"; pp. 979-991; IEEE Transactions on Image Processing; Jul. 1998.
Kayargadde, et al.; "An Objective Measure for Perceived Noise"; pp. 187-206; Signal Processing 49; 1996 Elsevier Science.
Liu, et al.; "Defficient DCT-Domain Blind Measurement and Reduction of Blocking Artifacts"; pp. 1139-1149; IEEE Transaction on Circuits and Systems for Video Technology; Dec. 2002.

(Continued)

Primary Examiner—Phuoc Tran

(57) ABSTRACT

A system and method for estimating compression image noise. Image data for an image is received. A compression ratio, an image size ratio, and an activity for the image are determined. Compression artifact estimation is determined based on the compression ratio, the image size ratio, and the activity.

24 Claims, 4 Drawing Sheets

OTHER PUBLICATIONS

Fan, et al.; "Identification of Bitmap Compression History; JPEG Detection and Quantizer Estimation"; pp. 230-235; IEEE Transactions on Image Processing; Feb. 2003.

Yu, et al.; "A Triage Metric for Determining the Extent of DCT-Based Compression Artifacts in a Digital Image"; pp. 443-452; Journal of Imaging Science and Technology; Oct. 2002.

Katajamaki, et al.; "Objective Quality Potential Measures of Natural Color Images"; pp. 250-263; Journal of Imaging Science and Technology; May/Jun. 1998.

Nill, et al.; "Objective Image Quality Measure Derived From Digital Image Power Spectra"; pp. 813-825; Optical Engineering, Apr. 1992.

Chan, et al.; "Modeling and Validation of a Psychovisually Based Image Quality Evaluator for DCT-Based Compression"; pp. 485-495; Signal Processing Image Communication; 2002 Elsevier Science.

Ohm J-R—"Digital Bildcodierung, Teil B: Quantisierung und Codierung"—1995.

Saha S et al—"An ANalysis on the Effect of Image Activity on Lossy Coding Performance"—Proc of IEEE Int'l Symposium on Circuits and Systems—vol. 2 2000.

* cited by examiner

SYSTEM AND METHOD FOR ESTIMATING COMPRESSION NOISE IN IMAGES

TECHNICAL FIELD

Embodiments of the present invention relate to the field of image processing.

BACKGROUND ART

Image processing is a process by which an imaging application alters input image data. For example, image processing may be used to change the color space of a digital image. Image processing may be implemented in conjunction with a printing device in order to adjust the color appearance or perceived sharpness of an image according to the specifications of the printing device. Often, an image includes noise artifacts that reduce image quality of the image. In particular, images compressed Joint Photographic Experts Group (JPEG) compression typically suffer from distinct types of deteriorations termed as JPEG artifacts.

Enhancing noisy images typically results in unwanted noise enhancement. The perceptual impact of JPEG artifacts is important for image enhancement, and the extent of the JPEG artifacts may be central to preferred image enhancement for the JPEG image. For example, many typical denoising techniques are based on the extent of JPEG artifacts in the JPEG image. Therefore, it is important to be able to estimate the perceptual impact of the JPEG artifacts prior to image enhancement.

Noise estimation techniques are used to estimate JPEG image artifacts. Currently, there are several methods of JPEG artifact estimation. However, the current available methods each present certain operational drawbacks or limitations. Specifically, typical JPEG artifact estimation techniques are computationally intensive. For example, one technique requires the identification of inbalances of harmonic content of blocks of pixels. This method processes every pixel of the image, resulting in a time consuming and computationally intensive method. Other similar methods for JPEG artifact estimation process the entire image, which is typically inefficient.

Other JPEG estimation methods, such as the use of neural networks, are very labor intensive, and require a significant amount of training. Furthermore, current methods do not account for enlarging or downsampling a JPEG image, which can change the number of perceived JPEG artifacts.

SUMMARY OF THE INVENTION

Various embodiments of the present invention, a method and system for estimating compression noise in images, are described herein. In one embodiment, image data for an image is received. A compression ratio, an image size ratio, and an activity for the image are determined. Compression artifact estimation is determined based on the compression ratio, the image size ratio, and the activity.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should be understood as not being drawn to scale except if specifically noted.

BEST MODE FOR CARRYING OUT THE INVENTION

Reference will now be made in detail to various embodiments of the invention. While the invention will be described in conjunction with these embodiments, it will be understood that they are not intended to limit the invention to these embodiments. On the contrary, the invention is intended to cover alternatives, modifications and equivalents as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
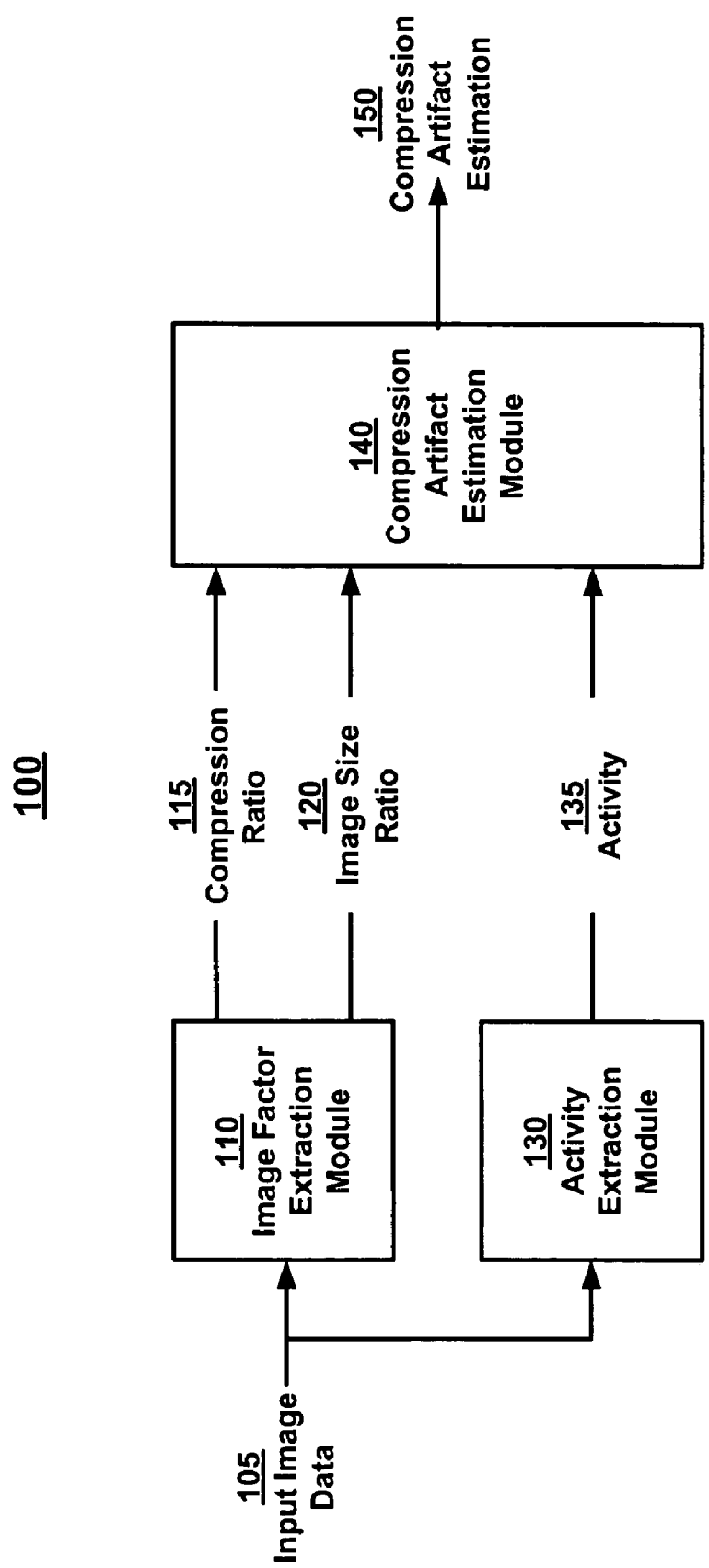
FIG. 1 is a block diagram of system for estimating compression noise artifacts of an image, in accordance with an embodiment of the present invention.

FIG. 1 is a block diagram of system 100 for estimating compression noise artifacts of an image, in accordance with an embodiment of the present invention. In one embodiment, the image is a Joint Photographic Experts Group (JPEG) image. It should be appreciated that while various described embodiments are directed towards JPEG image data, other embodiments of the invention may be applied to other types of image data, such as Tagged Image File Format (TIFF) image data, Graphics Interchange Format (GIF) image data, and bitmap image data.

In one embodiment, system 100 utilizes sampled data of an image to determine an estimation of compression noise of an image. System 100 includes image factor extraction module 110, activity extraction module 130, and compression artifact estimation module 140. It should be appreciated that system 100 may be implemented within a computer system as software or as hardware. For example, a module may be a piece of software code, a hardware device, or a portion of a hardware device.

System 100 receives input image data 105 at image factor extraction module 110 and activity extraction module 130. In one embodiment, input image data 105 is a JPEG image. Input image data 105 includes luminance information, color information, image size information, rendering target image size information, and compressed file size information. It should be appreciated that image data 105 may also include other image information. For example, for a JPEG image, image data 105 may also include JPEG color scheme information Y (luminance) and Cr, Cb (chrominance). In one embodiment, the color information includes Red-Green-Blue (RGB) color scheme data. In another embodiment, the color information includes Cyan-Magenta-Yellow-Black (CMYK) color scheme data. Input image data 105 includes a pixel grid, in which a particular pixel has associated image data. For example, a pixel of the pixel grid includes associated luminance value and color information.

In one embodiment, image factor extraction module 110 is configured to extract a compression ratio 115 and an image size ratio 120 from input image data 105. In general, the more compressed an image is, the greater chance there is of noticing compression noise artifacts. Compression ratio 115 is the area of the image divided by the compressed file size. In one embodiment, compression ratio 115 (C) is calculated according to Equation 1:

$$C = (j_W * j_H)/j_F \quad (1)$$

wherein $j_W$ is the width of the image, $j_H$ is the height of the image, and $j_F$ is the compressed file size of the image. It should be appreciated that input image data 105 includes $j_W$, $j_H$, and $j_F$.

In general, compression artifacts in an image will decrease if the image is sub-sampled. In other words, for a given rendered image size a smaller input image is more likely to have compression artifacts than a bigger image. Image size ratio 115 is a scaling factor based on perceptual image size $p_S$ and the actual image size $j_S$. In one embodiment, image size ratio 120 (s) is calculated according to Equation 2:

$$s = p_S/j_S \quad (2)$$

wherein, perceptual image size $p_S$ and actual image size $j_S$ are calculated according to Equations 3 and 4, respectively:

$$p_S = \sqrt{p_W * p_H} \quad (3)$$

$$j_S = \sqrt{j_W * j_H} \quad (4)$$

wherein $p_W$ is the perceptual, or rendering target, width of the image at its viewing size, $p_H$ is the perceptual, or rendering target, height of the image, $j_W$ is the width of the JPEG image, and $j_H$ is the height of the image. It should be appreciated that input image data 105 includes $p_W$, $p_H$, $j_W$, and $j_H$.

For example, a JPEG image having $j_W = 2400$ and $j_H = 1600$ is to be viewed on a monitor with a resolution of 1200×800 ($p_W = 1200$ and $p_H = 800$) would have an image size ratio of 0.5. Similarly, if the same JPEG image is to be printed on a 600 dots per inch (dpi) printer at 6"×4" ($p_W = 3600$ and $p_H = 2400$), the image size ratio is 1.5.

Figure 2:
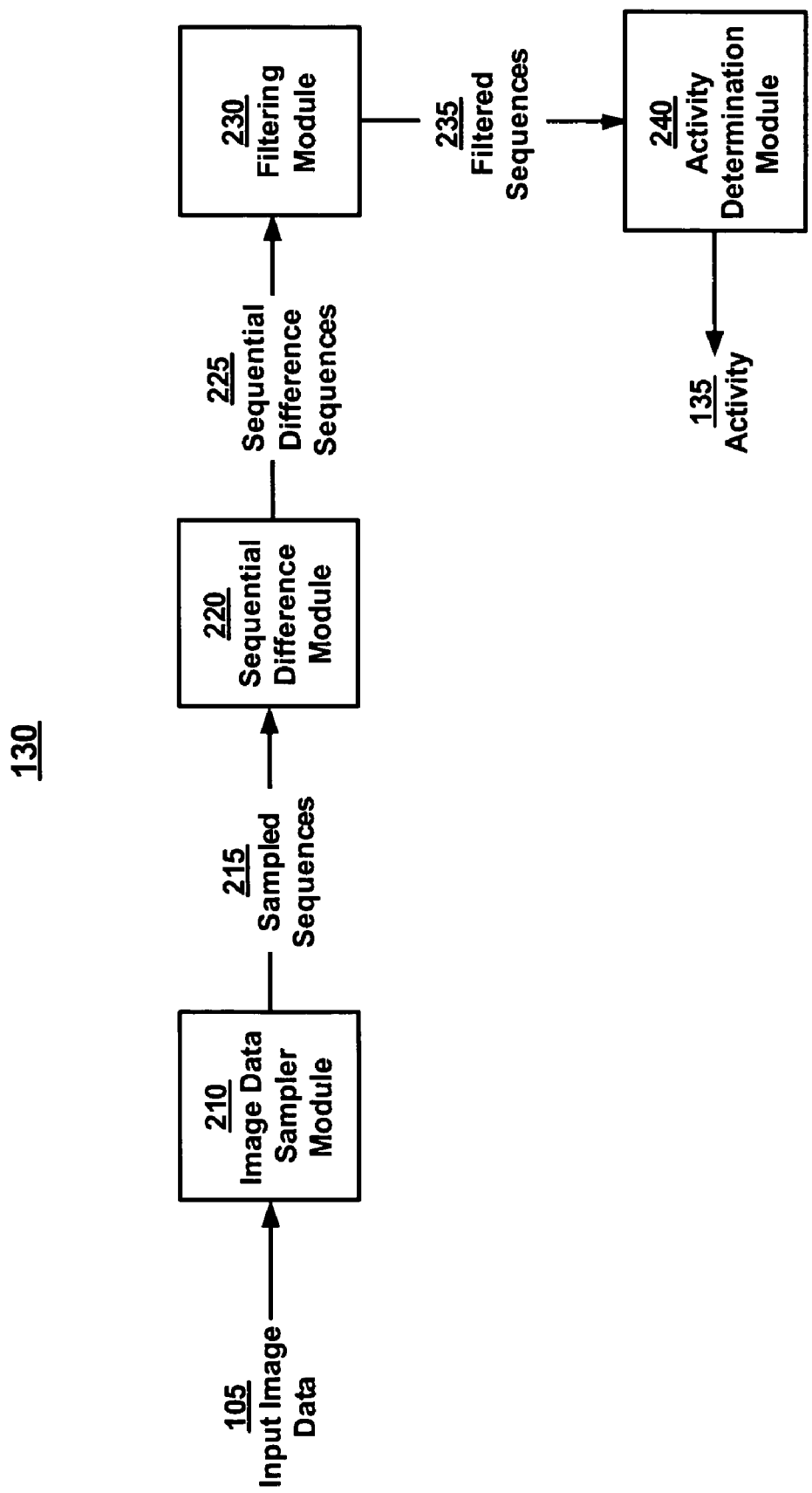
FIG. 2 is a block diagram of system for determining activity of an image, in accordance with an embodiment of the present invention.

In one embodiment, activity extraction module 130 is configured to determine activity from input image data 105. The activity relates to abrupt changes (e.g., edges) in the image, and is classified according to the amplitude and spread in the image of the edges. With reference to FIG. 2, a block diagram of activity extraction module 130 for determining activity of an image is shown, in accordance with an embodiment of the present invention. Activity extraction module 130 utilizes sampled data of an image to determine activity of an image. Activity extraction module 130 comprises image data sampler module 210, sequential difference module 220, filtering module 230, and activity determination module 240. It should be appreciated that activity extraction module 130 may be implemented within a computer system as software or as hardware. For example, a module may be a piece of software code, a hardware device, or a portion of a hardware device.

Activity extraction module 130 receives input image data 105 at image data sampler module 210. In one embodiment, input image data 105 is a JPEG image. Input image data 105 includes luminance information and color information. It should be appreciated that image data 105 may also include other image information. In one embodiment, the color information includes Red-Green-Blue (RGB) color scheme data. In another embodiment, the color information includes Cyan-Magenta-Yellow-Black (CMYK) color scheme data. In one embodiment, for a JPEG image, image data 105 may also include JPEG color scheme information Y (luminance) and Cr, Cb (chrominance). Input image data 105 includes a pixel grid, in which a particular pixel has associated image data. For example, a pixel of the pixel grid includes associated luminance value and color information.

Image data sampler module 210 is configured to sample image data from a portion of pixels of input image data 105. In one embodiment, the sampled image data is a luminance value for a pixel. In another embodiment, the sampled image data is a color value for a pixel. In one embodiment, image data from at least one column of pixels and one row of pixels is sampled. In one embodiment, image data from pixels of every Mth row and every Nth column is sampled, wherein M and N are positive integers. In one embodiment, M and N are equal. The sequences of sampled image data (e.g., sampled sequences 215) are associated with a particular column or row of pixels. Sampled sequences 215 are then forwarded to sequential difference module 220. A sampled sequence $X_i$ of sampled sequences 215 may be denoted as $X_i$, i=1, 2, 3, 4, ..., N.

Sequential difference module 220 is operable to determine the sequential differences between the sampled values of sampled sequences 215. In one embodiment, a sequential difference $Y_i$ of sequential difference sequences 225 is calculated according to $Y_i = X_{(i+1)} - X_i$, i=1, 2, ... N. It should be appreciated that the sequential differences determination can be combined into filtering module 230.

Filtering module 230 is operable to filter sequential difference sequences 225. In one embodiment, filtering module 230 includes a low pass filter. However, it should be appreciated that filtering module 230 may use more or different filters. For example, if an individual filter of filtering module 230 is configured to determine the sequential difference values of sampled sequences 215 (e.g., there is no sequential difference module 220), the low pass filter may be replaced with a band pass filter. In one embodiment, the low pass filter is a 6-tap Infinite Impulse Response (IIR) filter. However, it should be appreciated that any filter may be used. In one embodiment, low pass value $Z_i$ is calculated according to Equation 5:

$$Z_i = a_3 * Y_{(i-3)} + a_2 * Y_{(i-2)} + a_1 * Y_{(i-1)} + a_0 * Y_i - [b_3 * Z_{(i-3)} + Z_2 * L_{(i-2)} + Z_1 * L_{(i-1)}] \quad (5)$$

wherein $a_3$, $a_2$, $a_1$, $a_0$, $b_3$, $b_2$ and $b_1$ are design parameters of a 6-tap IIR filter. In one embodiment, $a_3 = a_0 = 0.0029$, $a_1 = a_2 = 0.0087$, $b_3 = -0.5321$, $b_2 = 1.9294$, and $b_1 = -2.3741$.

Filtering module 230 is operable to generate filtered sequences 235 including low pass values (e.g., $Z_i$).

Activity determination module 240 is operable to determine activity 135 based on filtered sequences 235. In one embodiment, activity 135 is determined by calculating the average of the absolute value of the filtered values of filtered sequences 235. For example, activity (A) 135 is calculated according to Equation 6:

$$A = \text{mean}(abs(Z_i)) \qquad (6)$$

wherein the mean is over all pixels of filtered sequences 235.

With reference to FIG. 1, compression artifact estimation module 140 is configured to determine compression artifact estimation 150 based on compression ratio 115, image size ratio 120, and activity 135. In one embodiment, compression artifact estimation 150 is calculated according to Equation 7:

$$\text{compression artifact estimation} = A(C^*s)^2 \qquad (7)$$

wherein A is activity 135, C is compression ratio 115, and s is image size ratio 120. Compression artifact estimation 150 corresponds to the expected visual impact of compression noise artifacts in the rendered image.

Figure 3:
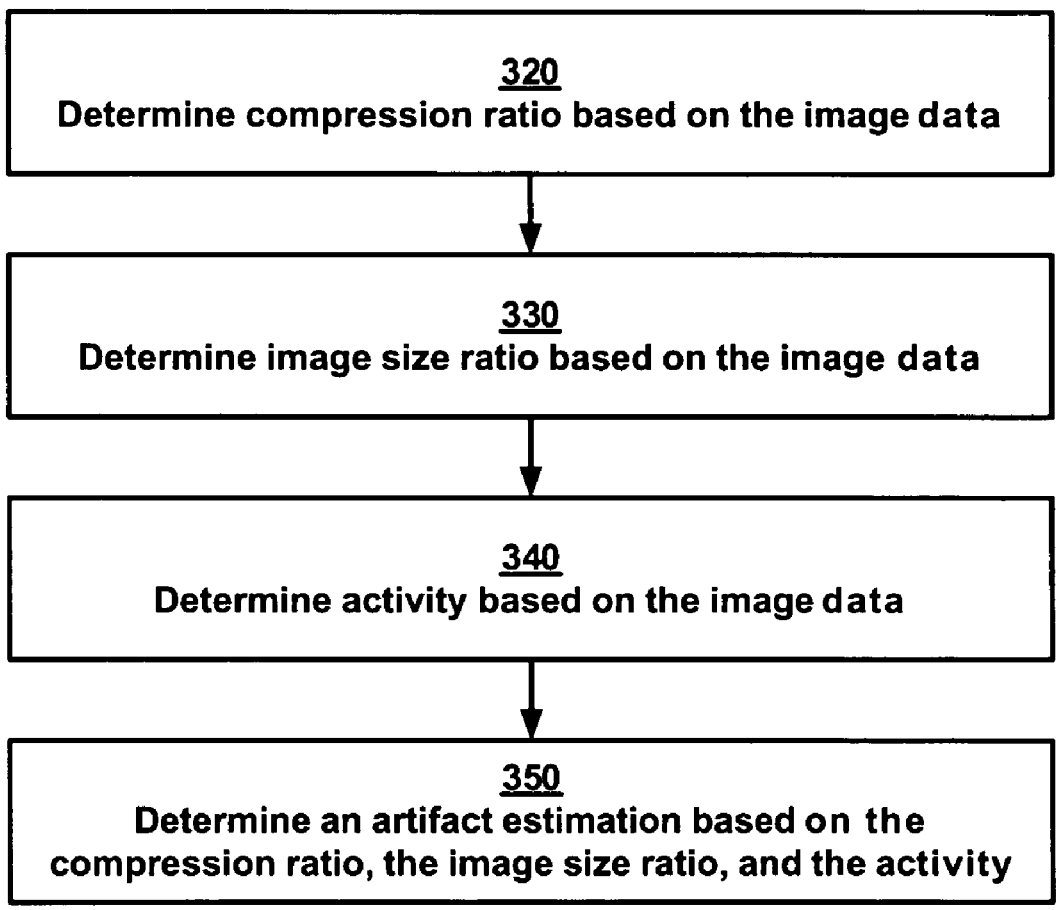
FIG. 3 is a flow chart of a process for estimating compression noise artifacts of an image, in accordance with an embodiment of the present invention.

FIG. 3 is a flow chart of a process 300 for estimating compression noise artifacts of a compressed image, in accordance with an embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIG. 3.

At step 320, the compression ratio for an image is determined based on image data. In one embodiment, the image data is JPEG image data. In one embodiment, the image data includes luminance information, color information, actual image size information, perceptual, image size information, and compressed file size information. In one embodiment, the compression ratio is the actual area of the image divided by the compressed file size. At step 330, the image size ratio for the image is determined based on the image data. In one embodiment, the image size ratio is the ratio of the rendering target size for the image to the actual image size.

Figure 4:
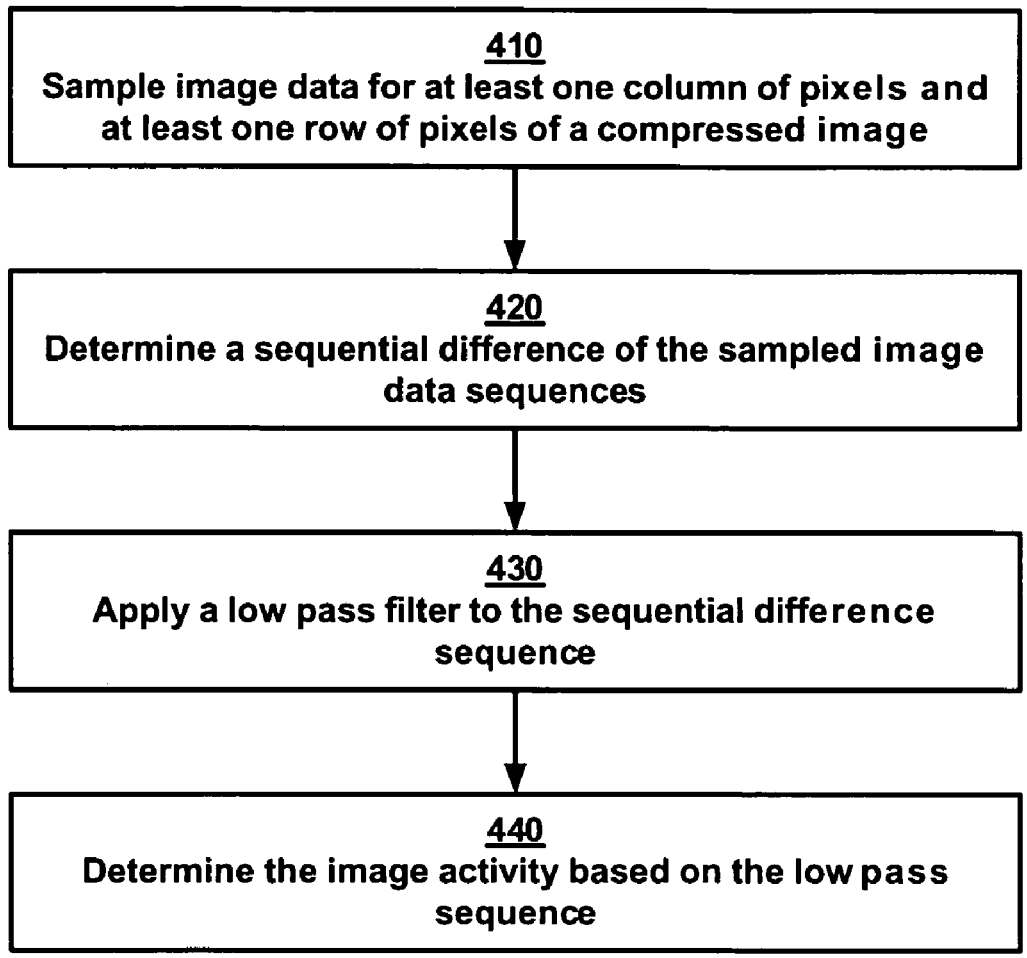
FIG. 4 is a flow chart of a process for estimating activity of an image, in accordance with an embodiment of the present invention.

At step 340, the activity for the image is determined based on the image data. FIG. 4 is a flow chart of a process 340 for determining image activity, in accordance with an embodiment of the present invention. In one embodiment, process 340 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 340, such steps are exemplary. That is, the embodiments of the present invention are well suited to performing various other steps or variations of the steps recited in FIG. 4.

At step 410 of process 340, image data for at least one column of pixels or at least one row of pixels of an image is sampled, resulting in at least one sequence of image data. In one embodiment, the sampled image data includes luminance values. In another embodiment, the sampled image data includes color values. In one embodiment, the sampled image data is resampled to emulate the sampling of the image as if the image was a smaller size. At step 420, a sequential difference of the sampled image data for pixels of the sequence of image data is determined, resulting in a sequential difference sequence.

At step 430, a low pass filter is applied to the sequential difference sequence, resulting in a low pass sequence of low pass values. In one embodiment, the low pass filter is a 6-tap IIR filter. At step 440, the image activity is determined based on the low pass values of the sampled pixels. In one embodiment, the activity is determined by calculating the average of the absolute value of the low pass values of the low pass sequences.

With reference to FIG. 3, at step 350 of process 300, compression artifact estimation is determined based on the compression ratio, the image size ratio, and the activity. In one embodiment, the compression artifact estimation is determined as described in Equation 7.

Embodiments of the present invention provide a method for estimating compression image noise. Specifically, embodiments of the present invention provide for effective compression noise artifact estimation by estimating the activity of the image. Furthermore, embodiments of the present invention are computationally efficient by performing the activity calculation in one-dimensional rows and columns, wherein the rows and columns are sampled from the image. Moreover, by using an image size ratio in determining the compression artifact estimation, the perceived image is accounted for, providing improved compression artifact estimation.

Various embodiments of the present invention, a method for estimating compression image noise, are thus described. While the present invention has been described in particular embodiments, it should be appreciated that the present invention should not be construed as limited by such embodiments, but rather construed according to the following claims.

What is claimed is:

1. A method for estimating compression image noise, said method comprising:
   determining a compression ratio for a compressed image having associated image data;
   determining an image size ratio for said compressed image;
   determining an activity for said compressed image; and
   determining a compression artifact estimation based on said compression ratio, said image size ratio, and said activity.

2. The method as recited in claim 1 wherein said image data comprises luminance information, color information, image size information, rendering target image size information, and compressed file size information.

3. The method as recited in claim 2 wherein said compression ratio is said image size information divided by said compressed file size information.

4. The method as recited in claim 2 wherein said image size ratio is said rendering target image size information divided by said image size information.

5. The method as recited in claim 2 wherein said determining said activity comprises:
sampling said image data for at least one of a column and a row of pixels of said compressed image;
applying a filter on sequential differences of sampled image data resulting in a sequence of filtered values; and
determining said activity based on one of said filtered values.

6. The method as recited in claim 5 wherein said filter is a band pass filter.

7. The method as recited in claim 5 further comprising determining said sequential differences of said sampled image data.

8. The method as recited in claim 5 wherein said filter is a low pass filter.

9. The method as recited in claim 5 wherein said determining said activity comprises calculating an average of absolute values of said filtered values.

10. The method as recited in claim 1 wherein determining said compression artifact estimation comprises multiplying said activity times a squared product of said compression ratio and said image size ratio.

11. The method as recited in claim 1 wherein said image data is JPEG image data and said compression artifact estimation is a JPEG compression artifact estimation.

12. A computer-readable medium having computer-readable program code embodied therein for causing a computer system to perform a method for determining activity of a compressed image, said method comprising:
sampling image data for at least one of a column and a row of pixels of said compressed image resulting in at least one sequence of image data;
determining a sequential difference of said image data for pixels of said sequence of image data resulting in a sequential difference sequence;
applying a low pass filter to said sequential difference sequence resulting in a sequence of low pass values; and
determining said activity based on one of said low pass values.

13. The computer-readable medium as recited in claim 12 wherein said image data is JPEG image data.

14. The computer-readable medium as recited in claim 12 wherein said image data comprises luminance values.

15. The computer-readable medium as recited in claim 12 wherein said low pass filter is an Infinite Impulse Response (IIR) filter.

16. The computer-readable medium as recited in claim 12 wherein said determining said activity comprises calculating an average of absolute values of said low pass values.

17. A system for estimating compression image noise, said method comprising:
means for receiving image data for a compressed image;
means for determining a compression ratio for said compressed image;
means for determining an image size ratio for said compressed image;
means for determining an activity for said compressed image; and
means for determining a compression artifact estimation based on said compression ratio, said image size ratio, and said activity.

18. The system as recited in claim 17 wherein said image data comprises luminance information, color information, image size information, rendering target image size information, and file size information.

19. The system as recited in claim 18 wherein said compression ratio is said image size information divided by said file size information.

20. The system as recited in claim 18 wherein said image size ratio is said rendering target image size information divided by said image size information.

21. The system as recited in claim 18 wherein said means for determining said activity comprises:
means for sampling said image data for at least one of a column and a row of pixels of said compressed image;
means for determining a sequential difference of said image data for said pixels resulting in a sequential difference sequence;
applying a low pass filter to said sequential difference sequence resulting in a sequence of low pass values; and
determining said activity based on one of said low pass values.

22. The system as recited in claim 21 wherein said means for determining said activity is configured to determine said activity by calculating an average of absolute values of said filtered values.

23. The system as recited in claim 17 wherein said means for determining said compression artifact estimation is configured to determine said compression artifact estimation by multiplying said activity times a squared product of said compression ratio and said image size ratio.

24. The system as recited in claim 17 wherein said image data is JPEG image data and said compression artifact estimation is a JPEG compression artifact estimation.

* * * * *